No. 712,598. Patented Nov. 4, 1902.
A. ROESLER.
DRAFT EQUALIZER.
(Application filed July 14, 1902.)
(No Model.)

Witnesses
J. P. Brett
Harry Ellis Chandler

Inventor
A. Roesler,
By Chandler & Chandler
Attorneys.

UNITED STATES PATENT OFFICE.

ANTON ROESLER, OF GENEVA, NEBRASKA.

DRAFT-EQUALIZER.

SPECIFICATION forming part of Letters Patent No. 712,598, dated November 4, 1902.

Application filed July 14, 1902. Serial No. 115,550. (No model.)

*To all whom it may concern:*

Be it known that I, ANTON ROESLER, a citizen of the United States, residing at Geneva, in the county of Fillmore, State of Nebraska, have invented certain new and useful Improvements in Draft-Equalizers; and I do hereby declare the following to be a full, clear, and exact description of the invention, such as will enable others skilled in the art to which it appertains to make and use the same.

This invention relates to draft-equalizers; and it has for its object to provide a construction wherein the draft of a number of animals will be equalized and wherein the parts may be adjusted to correspond to the different drafts of the different animals and may be adjusted for different numbers of draft-animals.

An additional object of the invention is to provide a new and useful arrangement of levers having advantages in point of coöperation and manner of attachment.

Figure 1:
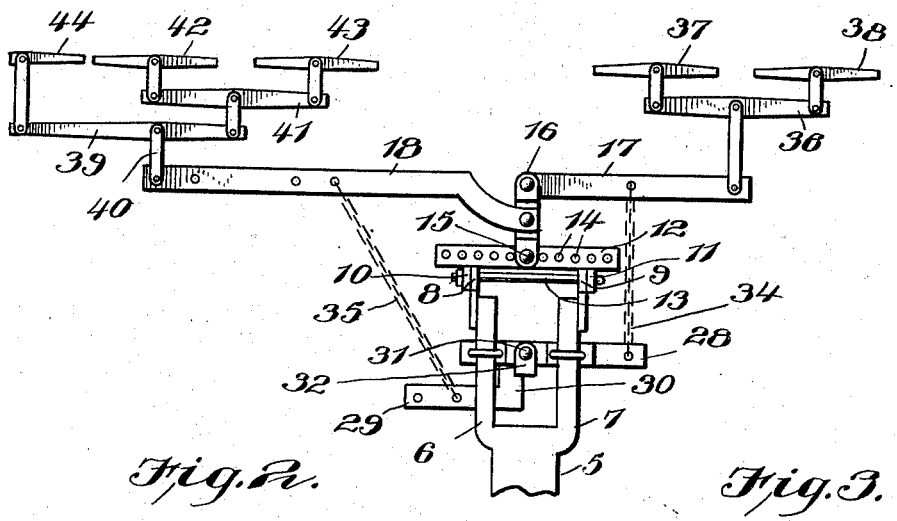
Figures 2, 3:
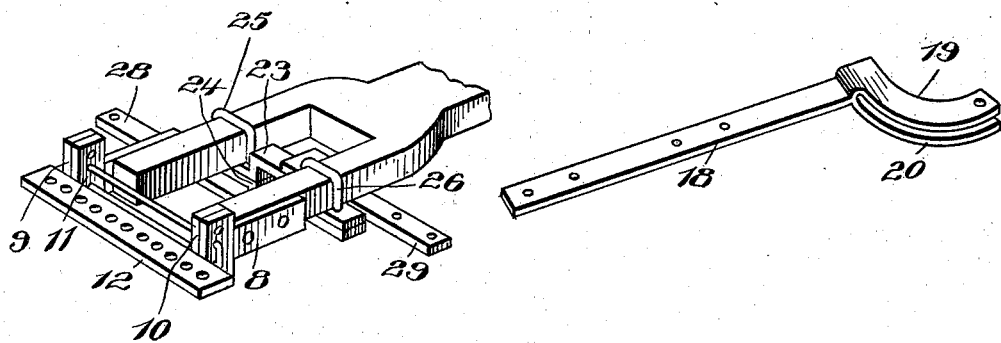
Figure 4:
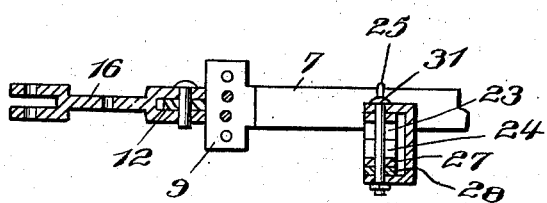

In the drawings forming a portion of this specification, and in which like numerals of reference indicate similar parts in the several views, Figure 1 is a top plan view of a draft-equalizer embodying the present invention. Fig. 2 is a detail perspective view showing the front end of a plow-beam with the clevises and rear equalizing-lever attached thereto, said view showing the upper side of the beam. Fig. 3 is a perspective view of the equalizing-lever at one side of the plow. Fig. 4 is a vertical section between the arms of the plow-beam and showing the pivotal mounting of the rear equalizing-lever.

Referring now to the drawings, there is shown a plow-beam 5, from the forward end of which project the spaced arms 6 and 7, having the vertical clevises 8 and 9 secured against their outer faces and to which in turn are secured the rearwardly-directed ears 10 and 11 of a horizontal clevis 12, said ears being held to the vertical clevises by means of the U-shaped bolt 13, the arms or members of which are passed through alining perforations in the ears of the clevises and hold the horizontal clevis 12 against vertical pivotal movement. The clevis 12, however, may be adjusted vertically to change the tilt of the plow-beam in operation. The clevis 12 has a line of perforations 14 therethrough to receive a bolt or pin 15, which is engaged also through the spaced ears of a link 16, said ears being arranged to receive the clevis 12 between them. The outer end of the link 16 is bifurcated, and between the resultant ears is pivoted one end of a lever 17. A lever 18 is provided and has an arc-shaped lateral extension at one end comprising spaced arms 19 and 20, between which the link is received at a point between the first-named lever and the clevis 12, this arc-shaped lateral extension being pivoted to the link, so that the lever 18 may have movement in a horizontal plane.

Two U-shaped plates 23 and 24 are provided, the arms thereof or sides being bent outwardly at their ends, and the corresponding arms of the two plates are brought to lie in mutual contact with the bent portions of the plates projecting in opposite directions. The outwardly-turned end portions of the upper plate are disposed against the lower faces of the arms 6 and 7, and U-shaped clips 25 and 26 are engaged over the arms 6 and 7 and through the outwardly-extending end portions of the U-shaped plates and hold the plates to the arms of the plow-beam. Against the web portion 27 of the lower U-shaped plate is pivoted the angular lever comprising laterally offset portions 28 and 29 and the connecting portion 30, that lies at right angles thereto, the pivot-bolt 31 being passed through one of the laterally-offset members of the lever adjacent to the inner end thereof, this pivot-bolt being engaged in a U-shaped strap 32, of metal, the ends of which are disposed against the web portion of the upper U-shaped plate and against the under side of the angular lever, respectively. The free end of the member 28 of the angular lever has a chain 34, connecting it to the lever 17 at a point substantially midway of the ends of the latter, while a second chain 35 connects the member 29 with the lever 18, so that movement of the lever 18 will be conveyed through the angular lever to the lever 17, and vice versa, it being noted that the lever 18 has a number of perforations therein, as has also the member 29, so that the chain 35 may be shifted to vary the leverage, as will be understood.

Connected to the free end of the lever 17 is a doubletree 36, to which are connected singletrees 37 and 38 in the usual manner. The free end of the lever 18 is connected to a lever 39 by means of a link 40, and the link may be connected at different points of the length of the lever 18. The link 40 is connected nearer to one end of the lever 39 than the other, and to the near end of the lever 39 is connected the doubletree 41, to which are connected the singletrees 42 and 43. A singletree 44 is connected to the opposite end of the lever 39. With this arrangement five horses may be hitched. The outside horses are hitched to the singletrees 38 and 44, and the middle horse is hitched to the singletree 43. When four horses are to be hitched to the plow instead of five, the lever 39 is removed and the doubletree 41 is connected directly to the lever 18 by means of a link at a point nearer to the near end of the lever and at a suitable distance therefrom to balance the pull on the two doubletrees. The chain 35 is then shifted from the inner hole of the member 29 of the angular lever to the outer hole thereof, while the opposite end of the chain is engaged in a hole of the lever 18 near to the inner end of the latter. It will be understood, of course, that these parts may be shifted or adjusted as may be necessary when hitching different numbers of animals and in hitching animals of different strengths.

What is claimed is—

1. In a draft-equalizer the combination with a clevis adapted for attachment to a vehicle or implement to be drawn, of a link connected to the clevis, a lever pivoted to the free end of the link, a lever pivoted to the link between the clevis and the first-named lever, a lever pivotally mounted in the rear of the clevis, and connections between the rear lever and the first-named levers, the first-named levers having means for attachment of draft-animals thereto.

2. The combination with a plow-beam having spaced arms at its forward ends provided each with a vertical clevis, of a horizontal clevis having rearwardly-directed ears, means engaged with the ears and the vertical clevises for holding the second clevis to the beam, pivoted levers connected with the horizontal clevis, U-shaped plates having the ends bent outwardly and disposed in mutual contact, said plates being connected against the under faces of the arms, a lever pivoted to the web portion of the lower U-shaped plate, and flexible connections between said lever and the first-named levers, said first-named levers having means for attachment of draft-animals thereto.

In testimony whereof I affix my signature in presence of two witnesses.

ANTON ROESLER.

Witnesses:
J. H. SAGER,
PETER MASSETT.